United States Patent [19]

Bartlett et al.

[11] 3,915,689

[45] Oct. 28, 1975

[54] POLLUTION-FREE PROCESS FOR TREATING COPPER SULFIDE FLOTATION CONCENTRATES AND RECOVERING COPPER

[75] Inventors: Robert W. Bartlett; Hsin-Hsing Haung, both of Palo Alto, Calif.

[73] Assignee: The Board of Trustees of The Leland Stanford Junior University, Stanford, Calif.

[22] Filed: Oct. 12, 1973

[21] Appl. No.: 406,039

[52] U.S. Cl............................................ 75/3; 75/72
[51] Int. Cl.².......................................... C22B 15/00
[58] Field of Search.............................. 75/3, 72–76

[56] References Cited
UNITED STATES PATENTS

| | | | |
|---|---|---|---|
| 1,098,883 | 6/1914 | Colley...................................... | 75/3 |
| 3,235,371 | 2/1966 | Volin et al............................... | 75/3 |
| 3,473,918 | 10/1969 | Foard...................................... | 75/72 X |
| 3,700,431 | 10/1972 | Themelis et al. ..................... | 75/72 X |
| 3,751,240 | 8/1973 | Green..................................... | 75/72 X |

FOREIGN PATENTS OR APPLICATIONS

| | | | |
|---|---|---|---|
| 1,115,905 | 6/1968 | United Kingdom...................... | 75/3 |

*Primary Examiner*—Allen B. Curtis
*Attorney, Agent, or Firm*—Donovan J. De Witt

[57] ABSTRACT

Copper is recovered from copper sulfide flotation concentrates or any copper sulfide ore without emitting significant amounts of sulfur dioxide ($SO_2$). Balls or pellets of the copper sulfide and lime are formed and roasted to produce a shell of reaction products, which includes anhydrite ($CaSO_4$) and oxidized copper, and to cause oxidation of the copper sulfide minerals at the shell/core interface whereby $SO_2$ formed in the reaction must pass through the shell before release and is largely converted to anhydrite. The temperature is controlled to prevent escalation, thereby to retain the sulfur in solid form during the roast and also to prevent formation of copper ferrite ($CuO.Fe_2O_3$). Copper is recovered from the pellet product by sulfuric acid leaching followed by direct electrowinning in a preferred embodiment although solvent extraction/electrowinning and cementation are contemplated.

12 Claims, 4 Drawing Figures

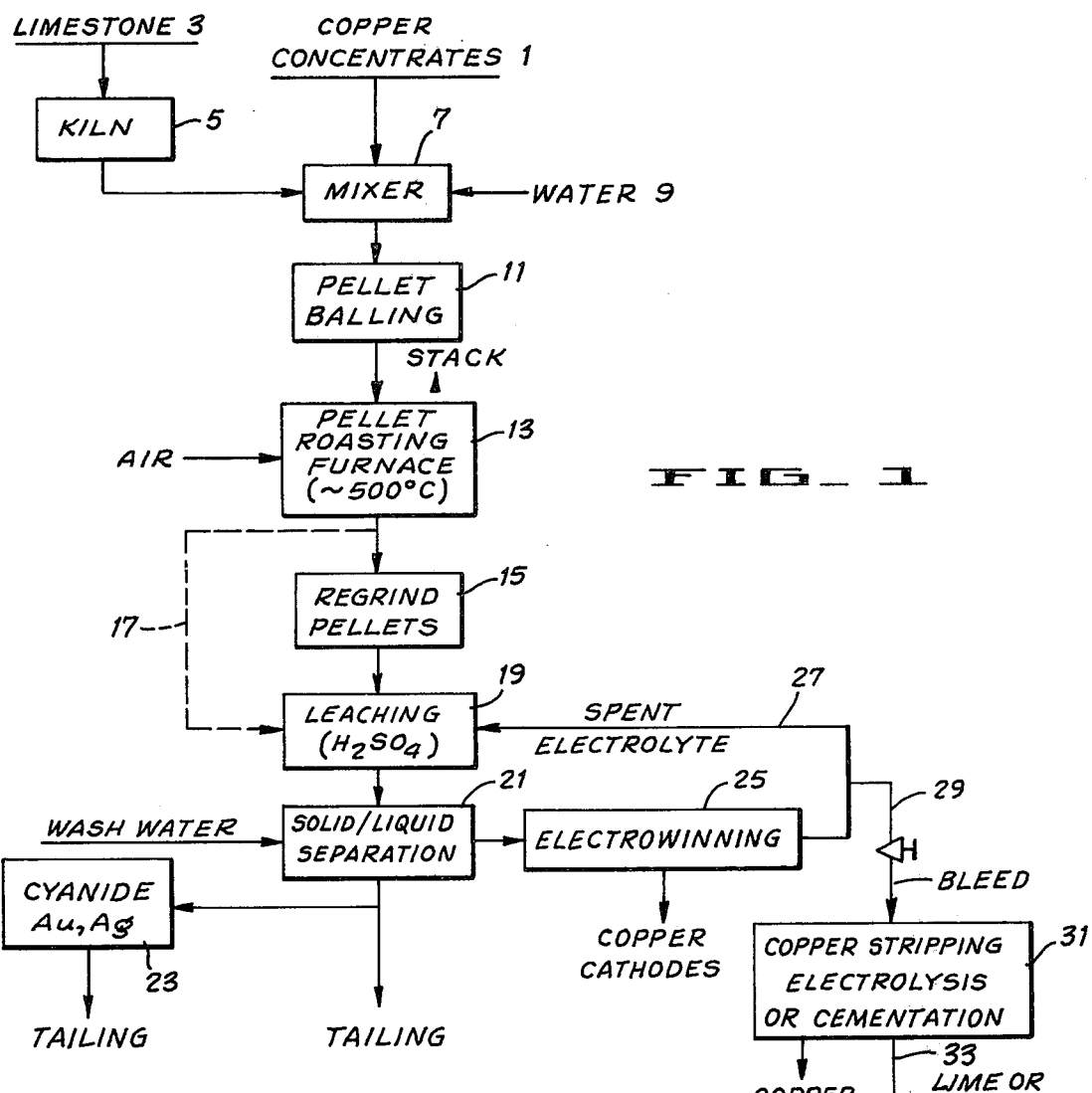
FIG_1
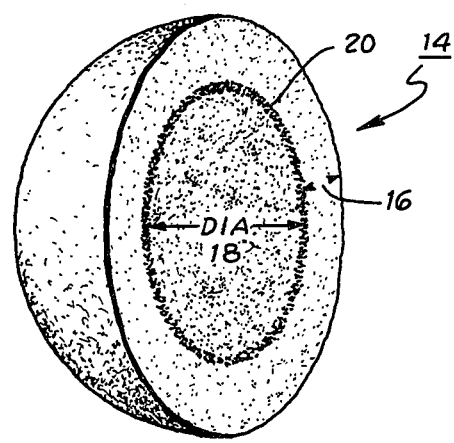
FIG_2

POLLUTION-FREE PROCESS FOR TREATING COPPER SULFIDE FLOTATION CONCENTRATES AND RECOVERING COPPER

BACKGROUND OF THE INVENTION

Sulfides of copper, including chalcopyrite ($CuFeS_2$) and other copper sulfide minerals, constitute a major source of copper. New pollution control regulations limit the sulfur dioxide which may be released to the atmosphere to an amount which is well below the emission level of most practical copper recovery processes now in use for copper sulfides. Capturing and removing the undesired emissions becomes prohibitively expensive. Therefore, considerable effort has been expended in finding a process which eliminates the $SO_2$ emissions or reduces them to a tolerable level and is at the same time economically feasible.

F. P. Haver and M. M. Wong report roasting a mixture of chalcopyrite concentrate and a number of calcium, magnesium and sodium compounds simultaneously to convert the $SO_2$ to an inert solid sulfate (see F. P. Haver and M. M. Wong, "Making Copper Without Pollution", Mining Eng., 24 No. 6, 52 (1972). They found that hydrated lime is an effective reagent, being capable of converting approximately 99% of the sulfur to $CaSO_4$, while the other reagents tested did not fix enough of the sulfur to meet the 90% emission standard. Further they found rabbling to be essential. The oxidation reactions are exothermic and the temperature of a rabbled powder charge cannot be prevented from increasing markedly (they report temperatures "possibly greater than 1000°C"). The formation of copper ferrite $CuO \cdot Fe_2O_3$ at the higher temperatures could not be prevented. This fact markedly increases the cost of the overall recovery process since copper ferrite does not dissolve in sulfuric acid but requires a boiling hydrochloric acid (HCl) leach with its subsequent elaborate processing.

Fluidized bed studies using mixtures of lime and copper concentrates in which chalcopyrite was the major mineral have not produced a practical $SO_2$ emission-free process. Temperature escalation and poor retention (high emission) of $SO_2$ characterize such efforts.

OBJECTS AND SUMMARY OF THE INVENTION

It is an object of this invention to provide a process for obtaining copper from its sulfides with very low emission of $SO_2$.

It is another object of the invention to provide sufficient residence time of $SO_2$ in a roasted mixture of lime and copper sulfide containing materials to cause substantial conversion of sulfur to anhydrite.

It is a further object of the invention to provide means whereby the temperature of a roasted mixture of lime and copper sulfide containing materials can be controlled and prevented from escalating thereby to prevent formation of undesired products in the mixture.

In carrying out the present invention pellets or balls are formed of the mixture of lime and the copper sulfide-containing material and the pellets so formed are roasted at low temperatures to form a reaction product which includes anhydrite and oxidized copper. This reaction product forms a shell around the unreacted mineral core and blocks emission of $SO_2$. Oxidation of copper takes place at the reaction product shell/unreacted pellet core interface. Reaction is carried to completion so that the pellet is entirely converted to reaction product material. The oxidized copper is subsequently recovered, preferably by leaching and electrolysis.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings.

BRIEF DESCRIPTION OF THE DRAWINGS

FIG. 1 is a flow diagram showing the steps in the process for recovering copper starting with limestone and copper concentrates;

FIG. 2 is an enlarged cross sectional representation of a ⅜ inch lime/concentrate pellet roasted for 30 minutes and showing the outer reaction product shell, the inner unreacted core and the sharp interface therebetween;

DESCRIPTION OF THE PREFERRED EMBODIMENTS

Figure 4:
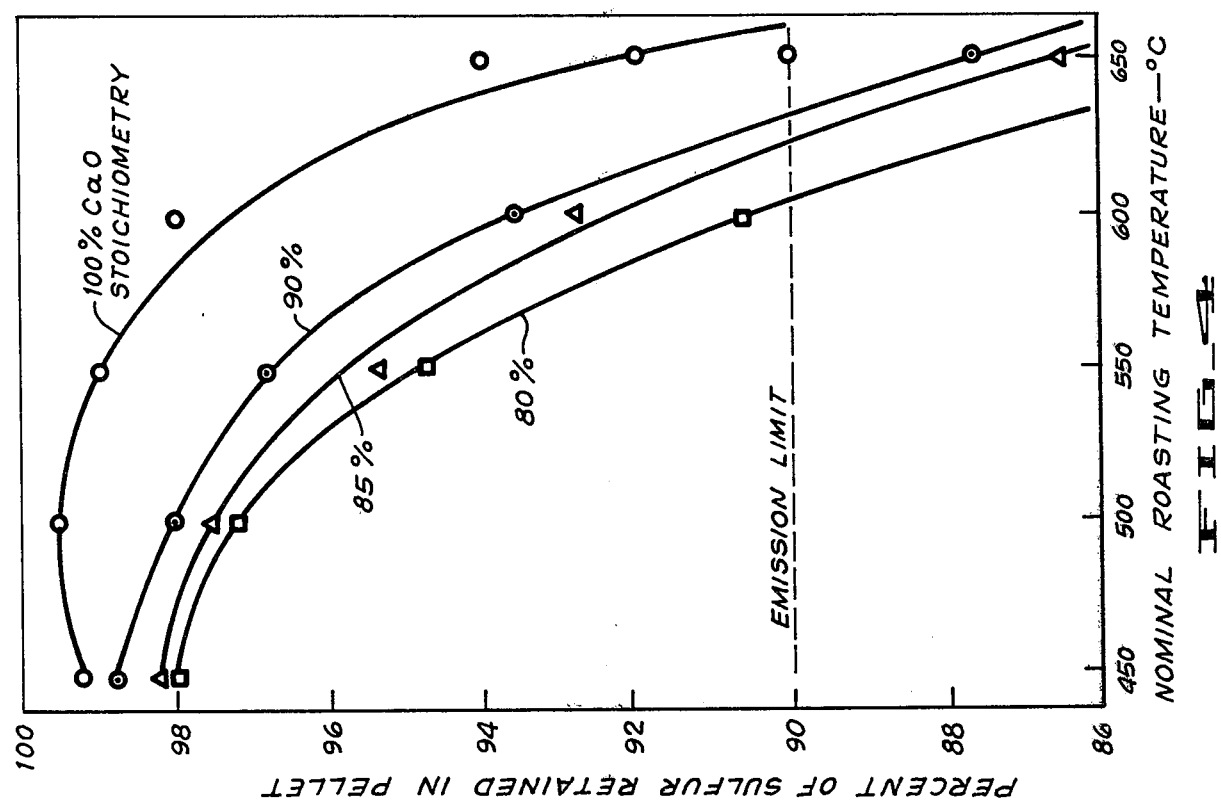
FIG. 4 is a plot showing sulfur retention for lime/concentrate pellets of different stoichiometries roasted at different furnace temperatures, the percent of sulfur retained in the pellet being plotted along the axis of ordinates and the nominal furnace temperature being plotted along the axis of abscissae.

The copper recovery system of the present invention is a combined pyro-hydrometalurgical process that fixes the sulfur from copper sulfides as anhydrite ($CaSO_4$) within lime/concentrate pellets during roasting. Very little sulfur dioxide ever leaves the pellet. The steps utilized in preferred embodiments are illustrated in the flow diagram of FIG. 1. In said diagram copper concentrates 1 and limestone 3 constitute the starting materials in the process flow.

The limestone 3 is calcined in a kiln 5 to produce the desired lime for pelletizing. Calcined limestones vary enormously in their microstructural properties and their reactivity with sulfur dioxide. Therefore, each limestone deposit considered for use in the process should be tested to verify its suitability. Limestones containing at least 5% $MgCO_3$ can be tolerated by using a bleed to remove $MgSO_4$ in the hydro-metallurgical circuit.

The copper concentrates need only be fine enough to possess good balling characteristics. Experience suggests that 60% −325 mesh concentrate will produce good results. Successful results have been obtained using −200 mesh concentrates. The lime and copper concentrates are mixed in a conventional commercial mixer 7. In order to provide a mixture susceptible to balling or pelletizing, water 9 is added at the mixing step. In this connection, it is worth noting that lime is a natural binder for agglomerating the green pellets.

The green pellets may be formed by any means, such as by pressing or balling. As illustrated, the mixed lime and copper concentrates are delivered to a balling machine 11 which may be of the conventional commercial type used in iron ore pelletization. For reasons which are discussed in more detail subsequently, an ideal pellet size is about ⅜ inch in diameter. However, good results can be had with pellets having diameters ranging from about ⅛ to ¾ inch.

After pellets of the proper size are formed, they are delivered to and passed through a roasting furnace 13 in order to transform the copper concentrates from sulfides to oxides. The reason, of course, for forming oxides of copper is that pure copper is recoverable from the oxides by a number of known processes. A traveling grate roasting machine is well suited to the lime/concentrate pellet roasting requirements. The traveling grate (not illustrated here) consists of an initial heating section (preheating section) followed by a longer section throughout in which an approximately constant bed temperature is maintained by a controlled draft. As an alternative, a rotary kiln with a heating zone (preheating section) followed by a long cooled section of nearly constant bed temperature is an appropriate process reactor, in which case heat dissipation through the cooled wall of the kiln is supplemented by air introducted at stations along the kiln from blowers attached to the kiln.

Note here the emphasis on temperature control. Temperature is a most important parameter and the optimum pellet surface temperature for both sulfur retention and copper extraction is about 500°C., with a range of about between 400° and 600°C. being highly acceptable. These temperatures are nominal furnace temperatures. There is a temperature increase with the individual pellets between 50° and 100°C. that occurs during the first 30 minutes of roasting. Such a temperature rise is within acceptable limits. However, controlled draft sections in the grate 13 are necessary to prevent excess temperature elevation.

In view of the importance of the lime/concentrate pellet, its size, relative content and temperature during processing, a digression from the actual process steps is made here to consider the reactions taking place and some of the parameters which are critical to the reactions and/or requisites for a practical process.

Initially, when the pellet (from pellet balling 11) of copper sulfide minerals and hydrated lime [Ca(OH)$_2$] is heated in air (pellet roasting furnace 13), water vapor flowing out of the pellet from the decomposition of Ca(OH)$_2$ blocks any ingress of oxygen. Hence in the lime/concentrate pellet roast process calcium oxide (CaO) is the principle reactant with SO$_2$ and oxygen to form anhydrite. The dehydration (weight loss) equation is as follows:

$$Ca(OH)_2 \rightarrow CaO + H_2O \uparrow$$

The oxidation reactions (weight gain) which takes place at the controlled low temperatures described here are typically as follows:

CuFeS$_2$ + 13/4 O$_2$ → CuO + ½ Fe$_2$O$_3$ + 2SO$_2$
CuFeS$_2$ + 15/4 O$_2$ → CuSO$_4$ + ½ Fe$_2$O$_3$ + SO$_2$
CuFeS$_2$ + 7/2 O$_2$ → ½ (CuO·SuSO$_4$) + ½ Fe$_2$O$_3$ + 3/2 SO$_2$

Oxidation of other copper sulfide minerals take place in similar fashion.

Notice that each of the oxidation reaction equations shows that SO$_2$ is a product. Fortunately, however, in a mixture of chalcopyrite and lime, SO$_2$ subsequently reacts with lime to form anhydrite. The sulfur fixation (weight gain) reaction is expressed as follows:

$$2CaO + 2SO_2 + O_2 \rightarrow 2CaSO_4$$

At equal temperatures the rate of lime sulfation is slower than the rate of chalcopyrite oxidation but in the same order of magnitude range. Furthermore, the average SO$_2$ residence time within the mixed charge must be a few minutes for substantial conversion to anhydrite. In other words, unless the SO$_2$ can be retained within the mixed charge for a sufficient time, it will escape to the atmosphere and a 90% emission control regulation cannot be met.

Efforts with fluidized and rabbled beds using a mixture of lime and copper concentrates in which chalcopyrite was the major mineral resulted in poor sulfur retention because of the low average residence time of SO$_2$ in the charge.

The emission problem is solved by pelletizing the charge prior to roasting. As the pellet is roasted, sulfation of lime occurs to form anhydrite in the shell. Oxidation of the copper sulfide minerals occurs only at the interface separating the core of the pellet from its reacted shell. Sulfation of lime occurs in the shell as SO$_2$ diffuses into it but the sulfation occurs primarily in a thin diffuse zone near the core/shell interface. The unreacted core of the pellet is continually shrinking during the roasting and the distance over which the SO$_2$ must diffuse to escape the pellet increases with roasting time. The net effect is that much more than 90% of sulfur can be retained in pellets with an average diameter of only ⅜ inch.

For a better understanding of the process, the cross section of a partially reacted pellet 14, is shown in FIG. 2. The Figure shows an outer reacted shell 16, containing major amounts of CaSO$_4$, Fe$_2$O$_3$, CuO and gangue minerals and minor amounts of CuSO$_4$ and CuO·CuSO$_4$, an inner unreacted core 18 consisting of the unroasted residual pellet and a sharp interface 20 between the two. The particular pellet was ⅜ inch in diameter roasted 30 minutes at 500°C. The outer shell 16 was approximately 1/16 inch thick and the unreacted core about ¼ inch in diameter.

Figure 3:
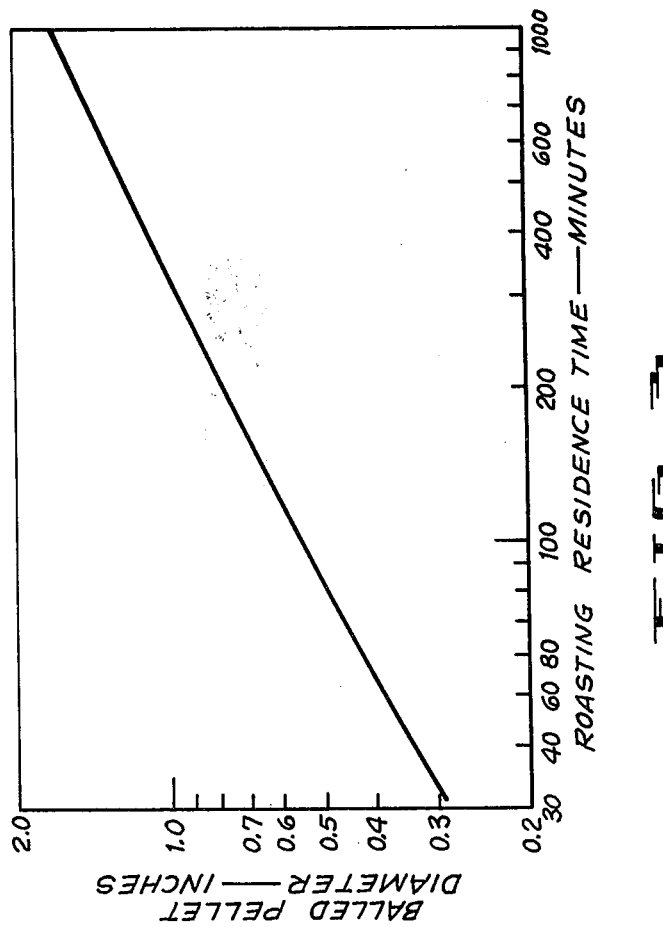
FIG. 3 is a graph showing the roaster residence times for balled pellets of different diameters, roaster residence times in minutes being plotted along the axis of abscissae and the diameter in inches of balled pellets being plotted along the axis of ordinates.

Electron beam microprobe traverses across the interface 20 show excellent correlation between calcium and sulfur in the shell 16 and between copper and sulfur in the core 18. Roasting residence times in minutes for complete reaction of balled pellets are plotted along the axis of abscissae and balled pellet diameters in inches along the axis of ordinates of FIG. 3. Note the times are substantially independent of temperature.

Sulfur retention and temperature control are two major advantages of using pellets. Sulfur retention has already been discussed. Temperature control is necessary to prevent undue sulfur emissions and also to prevent formation of unwanted copper compounds. For example, the high temperature oxidation (weight gain) reaction using the mixture discussed herein is expressed by the following equation:

CuFeS$_2$ + 13/4 O$_2$ → ½ {CuO·Fe$_2$O$_3$} + ½ CuO + 2SO$_2$

The formation of the cupric ferrite requires additional expensive processing with hydrochloric acid (see Haver and Wong, supra) and the additional SO$_2$ emissions are not desirable. Unlike a rabbled charge or fluidized bed, a major temperature escalation can be prevented using pellets because oxidation of copper sulfides is confined to the core/shell interface 20 within the pellet 14 and limited by oxygen diffusion through the pores of the reacted shell 16. That is, the exothermic (heat generating) chemical reactions are limited to the interface between the reaction product shell and unreacted core of the pellet rather than throughout an unpelletized charge. Furthermore, the rate of this reaction is controlled by the diffusion of oxygen through the reaction product shell. Hence the rate of chemical reaction and rate of heat release decrease with pellet roasting time. This control of the rate of heat release, and consequently temperature rise, is not possible in a mixed lime-copper sulfide mineral powder charge that has not been pelletized. Passing additional air through a bed of pellets will not increase the roasting rate but will increase the rate of heat removal from the bed. Without pelletizing, additional air causes additional oxidation and heating.

Next consider the relative amounts of lime and copper sulfide minerals in the lime/concentrate mix (entered at the mixer 7). 100% lime stoichiometry is defined as that amount of lime required to convert all of the sulfur in the copper sulfide ore or concentrates to anhydrite. Ordinarily, it would be assumed that 100% lime stoichiometry should be used. However, the ability to use substoichiometric amounts of lime becomes an important consideration for the hydrometallurgical part of the process if leaching followed by direct electro-winning is used. Fortunately, roasting the lime/concentrate pellet at the lower (500°C.) temperatures yields significant quantities of $CuSO_4$ and $CuO \cdot CuSO_4$ as well as anhydrite. Consequently, substoichiometric amounts of lime can be used with only a small increase in $SO_2$ emissions; an increase well within permissable limits.

Comparative results at various lime amounts and temperatures are shown in FIG. 4 where percent of sulfur retained in the pellet is plotted along the axis of ordinates against nominal roasting temperature in degress centigrade along the axis of abscissae for 80%, 85%, 90% and 100% lime stoichiometry. From the plot it is seen that for the 500° to 600°C. range sulfur retention is well above the 90% emission limit for the lime stoichiometries plotted.

Before considering subsequent steps in the process, a practical commercial pellet roasting unit to produce 50,000 tons per year (tpy) of copper is described as an example. It is assumed that the equipment can be operated 85% of the time. Consequently the required copper production rate is 7 tons per hour (tph) and with a copper concentration of 12.9% in the roasted pellets the pellet discharge rate is 55 tph. The bulk density of the fired pellets is approximately 125 lbs/cu ft. A pellet size range of —½ + ⅜ inch is used in the preferred embodiment. This size is large enough to provide excellent sulfur retention and the residence time required for complete reaction is not too long. This is the most commonly used size range in iron ore pelletization and balling technology is well developed. All balled pellets over about ½ inch are removed by a trommel or other screening device before roasting. When void space between the pellets (32%) is considered the effective bed density is 80 lbs/cu ft. Crushing strengths of green pellets are adequate to support an 18 inch deep bed on a traveling grate machine.

With the pellets roasted, the sulfur of the copper concentrates fixed as anhydrite and the copper of the concentrate converted to oxides, the remainder of the steps in the flow diagram of FIG. 1 are primarily for recovery of pure copper. The pellets may be leached in pellet form in vats, however for most effective leaching, the next operation in the process as illustrated is to comminute the pellets. A conventional commercial grinding or crushing machine 15 is positioned to receive the roasted pellets directly from the roasting furnace 13 for this purpose. For purposes of economy, a screening may be done between the furnace 13 and the pellet grinder 15 so that any of the material which is sufficiently fine for subsequent operations may bypass the grinding operation (see dash flow line 17).

The fine particles derived from the pellets are delivered to a leach bath 19 containing sulfuric acid ($H_2SO_4$) for copper extraction from the gangue. The leach, of course, constitutes the first step of the hyrometallurgical part of the process. Recovery of the copper from the leach liquor involves the use of conventional copper industry methods such as (i) direct electrowinning, (ii) solvent extraction/electrowinning or (iii) cementation. However, in order to give a complete description of copper recovery using the invention, practical processes are given here.

As previously pointed out, the principal copper product of the pellet roast is CuO with small amounts $CuSO_4$ and $CuO \cdot CuSO_4$. As a result of the sulfuric acid leach, the copper roast products are dissolved and transformed to $CuSO_4$. The reaction for each of the principle copper compounds may be expressed as follows:

$CuO + H_2SO_4 \rightarrow CuSO_4 + H_2O$
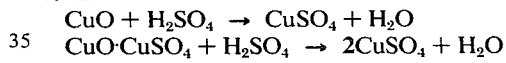

Substantially all copper sulfate is in solution at this point in the process whereas the gangue and $CaSO_4$ remain a solid. Sulfates of magnesium and some iron go into the solution and create special problems which are dealt with more fully later. For the time being consider only the $CuSO_4$ which is dissolved in the leach solution. The solution contains the ions $Cu^{++}$ and $SO_4^=$. Subsequently, the leach product is subjected to a solid/liquid separation in any of a variety of conventional methods 21. Also wash water is supplied to the solid/liquid separator to insure removal of all soluble copper from the tailing.

As a practical matter, and a side issue with respect to the copper recovery, the primary tailing from the solid/liquid separation 21 can be subjected to cyanidation 23 or other treatment to recover the valuable gold and silver which are likely to be in the initial concentrates of the pellets. The tailing may then be discarded or subjected to further treatment if desired.

In order to recover the copper in pure form from the liquid product of the solid/liquid separator 21, the liquid product flows to a conventional electrowinning cell 25 where the copper is deposited as cathode copper by electrodeposition. This is, of course, only one of the recovery methods which may be used at this stage.

The equation for what takes place during the electrodeposition may be expressed as follows:

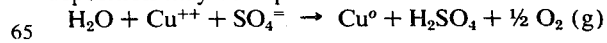

The cathode copper is removed as the desired end product.

From the above equation, it is seen that sulfuric acid is regenerated in the electrowinning cell 25, hence, the spent electrolyte is returned to the leach (see flow line 27). In theory, with the use of 100% lime stoichiometry (for 100% sulfur fixation during roasting) and 100% pellet roast (pellets are roasted throughout), acid would neither be generated nor lost in the leach electrowin circuit and the lime not converted to anhydrite in the roast is consumed during leaching to neutralize excess acid, producing gypsum. All of the sulfate formed during roasting enters the primary tailing either as anhydrite or gypsum.

Actually, some unused lime results because there is only partial sulfation of copper during roast. Further, during electrolysis the copper sulfate formed in roasting generates new acid (see above equation) that is not needed for leaching.

During roasting, because there is incomplete fixation of sulfur, the amount of lime included in the pellets must be decreased (less than 100% lime stoichiometry). Furthermore, part of the spent electrolyte must be bled (flow line 29) to eliminate magnesium and other impurities. Bleeding also eliminates acid which further reduces the amount of lime required in the pellets. Note that water lost in the bleed is conveniently made up in the wash water added during the solid/liquid separation. The reduced amount of lime used in the roast also lowers the necessary bleed rate as compared with the bleed rate needed for stoichiometric lime roast.

Limestones usually contain some magnesium carbonate which is calcined to magnesium oxide and readily sulfated ($MgSO_4$) during roasting. Limestones usually divide into low magnesium and high magnesium varieties. Low magnesium limestones generally contain 2 – 3% mole pct magnesium while high magnesium limestones contain 12 – 17% mole pct magnesium. The $MgSO_4$ is dissolved during leaching and will accumulate in a closed cycle leach/electrowin circuit unless adequate steps are taken to remove it. Although dissolved $MgSO_4$ does not adversely affect copper electrowinning from sulfate electrolytes, precipitation of excess $MgSO_4$ from a saturated solution cannot readily be confined to the leaching step and some precipitation may occur in the electrowinning cells.

The concentration of $MgSO_4$ in the electrolyte can be kept below a set level by bleeding in a minor portion of the spent electrolyte as shown in FIG. 1 (bleed line 29). Copper is stripped from the bled solution by a conventional electrolysis or cementation process 31. The end liquor (flow line 33) is a strong acid solution containing $MgSO_4$. Water pollution standards require neutralization of this liquor with lime or limestone before discarding it. Neutralization (station 35 on flow sheet) with lime or limestone precipitates the magnesium and sulfate ions as magnesium hydroxide, $Mg(OH)_2$, and gypsum, $CaSO_4 \cdot 2H_2O$, respectively. The amount of spent electrolyte removed depends on the desired level of $MgSO_4$ in the electrolyte and the magnesium content of the lime used in roasting. Fortunately, a reduced amount of lime, less than stoichiometric for sulfur, will provide adequate sulfur retention and does not lower the copper extraction, providing the roasting is carried out at an average pellet surface temperature near 500°C. The high sulfur retention results because of the extensive sulfation of copper at this temperature.

While the presence of magnesium in the leach/electrowin circuit does not interfere with the electrode position process, iron causes reduced electrical efficiency. Countracurrent leaching with spent electrolyte will tend to reduce the acidity as leaching proceeds, hydrolyze iron and thereby reduce the amount of soluble iron in the leach liquor. Tests have shown that iron can usually be kept below 4 grams per liter of leach solution in a counter-current leaching circuit. Solution purification steps are well within the state of the art. One very practical arrangement would involve the addition of organic solvent extraction and stripping steps between the solid/liquid separation 21 and the electrowinning 25. A flow sheet for such an arrangement is shown and described in the article, "A New Reagent for Liquid Ion Exchange Recovery of Copper", by D. W. Agers, J. E. House, R. R. Swanson, and J. L. Drobnick, Mining Eng., December 1965, pp 76–80.

Accordingly it will be understood that the present invention provides means for recovering copper from its compounds and at the same time meets the most stringent standards for prevention of the escape of effluents. Further, it will be understood that while particular embodiments of the invention have been shown and described, it is not limited to these alone since many modifications in the flow diagrams, instrumentalities employed and materials utilized can be made. It is contemplated that the appended claims will cover any such modifications as fall within the true spirit and scope of the invention.

What is claimed is:

1. A pellet for use in recovery of copper from sulfides of copper, said pellet composed of a mixture of sulfides of copper and lime, the amount of the said lime therein being between about 80% and 100% of the stoichiometric amount relative to the sulfur content of said sulfides of copper.

2. A pellet as defined in claim 1 wherein the diameter of said pellet is between ⅛ and ⅜ inch.

3. In the process of recovering copper from the sulfides of copper, pelletizing a mixture of lime and sulfides of copper and roasting the pellets so formed whereby a reaction product outer shell containing anhydrite is formed on said pellets defining an unreacted core therein and a well-defined reacting zone between said outer shell and said unreacted core during the roasting process.

4. The process as defined in claim 3 wherein said pellets are in a bed and said roasting step is conducted at pellet surface temperatures between 400°C. and 600°C. with the roasting reactions carried to completion.

5. The process as defined in claim 4 wherein a fluid stream is passed through the said bed of pellets thereby to control temperatures prevailing in the bed.

6. The process as defined in claim 5 wherein the said roasted pellets are subsequently leached in sulfuric acid to solubilize copper in a leach liquor and said leach liquor subjected to a metal recovery step.

7. In the process as defined in claim 3 said pellets having a diameter of between ⅛ and ⅜ inch.

8. The process as defined in claim 7 wherein the lime therein is between about 80% and 100% of the stoichiometric amount relative to the sulfur content of the copper bearing ore, concentrates or other copper bearing material being processed.

9. The process as defined in claim 8 wherein the said pellets are in a bed and said roasting step is conducted at a pellet surface temperature between 400°C. and 600°C.

10. The process as defined in claim 9 wherein a fluid stream is passed through the said bed of pellets thereby to control temperatures prevailing in the bed.

11. The process as defined in claim 10 wherein the said roasted pellets are leached in sulfuric acid to solubilize copper in a leach liquor and said leach liquor is subjected to a metal recovery step.

12. The method of recovering copper from copper sulfide ore without emitting significant amounts of sulfur dioxide including the steps of roasting pellets which comprise a mixture of lime and copper sulfide ore and which have a diameter of between ⅛ and ⅜ inch, said roasting step being conducted at a pellet surface temperature between 400°C and 600°C whereby a shell of reaction products is produced which shell prevents emission of significant amounts of $SO_2$, said shell of reaction products containing major amounts of $CaSO_4$, $CuO$, $Fe_2O_3$ where iron is a constituent, and gangue minerals, and controlling the temperature to prevent escalation thereby preventing formation of copper ferrite.

* * * * *